United States Patent [19]
Badwal et al.

[11] Patent Number: 5,942,349
[45] Date of Patent: Aug. 24, 1999

[54] FUEL CELL INTERCONNECT DEVICE

[75] Inventors: Sukhvinder P. S. Badwal, Mulgrave; Karl Foger, Kew; Xiao G. Zheng, Oakleigh; Don Jaffrey, Grindelwald, all of Australia

[73] Assignee: Ceramic Fuel Cells Limited, Australia

[21] Appl. No.: 08/913,329

[22] PCT Filed: Mar. 15, 1996

[86] PCT No.: PCT/AU96/00140

§ 371 Date: Nov. 25, 1997

§ 102(e) Date: Nov. 25, 1997

[87] PCT Pub. No.: WO96/28855

PCT Pub. Date: Sep. 19, 1996

[30] Foreign Application Priority Data

Mar. 15, 1995 [AU] Australia ................ PN1735

[51] Int. Cl.$^6$ .................................. H01M 2/00
[52] U.S. Cl. ................ 429/34; 429/30; 429/38; 429/39; 427/115; 427/126.3; 427/126.6; 427/419.2; 427/419.3
[58] Field of Search .................. 429/30, 34, 38, 429/39, 18; 427/115, 126.3, 126.6, 419.2, 419.3

[56] References Cited

U.S. PATENT DOCUMENTS 4,950,562  8/1990  Yoshida et al. ..................... 429/34

FOREIGN PATENT DOCUMENTS

| | | |
|---|---|---|
| 0 338 823 | 10/1989 | European Pat. Off. . |
| 5-205754 | 8/1993 | Japan . |
| 6-188003 | 7/1994 | Japan . |
| 7-045291 | 2/1995 | Japan . |
| 7-153469 | 6/1995 | Japan . |
| 7-201340 | 8/1995 | Japan . |

Primary Examiner—Bruce F. Bell
Attorney, Agent, or Firm—David J. Brezner; Walter Dreger; Flehr Hohbach Test Albritton & Herbert

[57] ABSTRACT

An electrical interconnect device for a planar fuel cell, comprising solid oxide electrolyte (44), an anode and a cathode (42), is described. The interconnect device comprises a plate-like chromium-containing substrate (22) having gas-flow channels (28) on the cathode-side and a coating on the cathode-side. The coating comprises an oxide surface layer comprising at least one metal M selected from Mn, Fe, Co and Ni, and an M, Cr spinel layer intermediate the substrate and the oxide surface layer. The intermediate spinel layer is formed by reaction of M oxide with surface chromium oxide on the substrate. The coating material may be applied as oxide or as salt or metal, or a mixture, and then converted to oxide. The M-metal(s) may be mixed with non-M metal or be doped. Methods of application are described in which the oxide surface layer is partially reacted to form the intermediate spinel layer.

62 Claims, 15 Drawing Sheets ized ZrO₂ which is an oxygen ion conductor.

FUEL CELL INTERCONNECT DEVICE

This application is a 371 of PCT/AU96/00140 filed Mar. 15, 1996.

TECHNICAL FIELD

The present invention relates to fuel cells and is particularly concerned with an interconnect device for planar solid oxide fuel cells and with a method for preparing such an interconnect device.

BACKGROUND ART

Fuel cells convert gaseous fuels (such as hydrogen, natural gas, and gasified coal) via an electrochemical process directly into electricity. A fuel cell operates like a battery, but does not need to be recharged and continuously produces power when supplied with fuel and oxidant, normally air. A typical fuel cell consists of an electrolyte (ionic conductor, $H^+$, $O^{2-}$, $CO_3^{2-}$ etc.) in contact with two electrodes (mainly electronic conductors). On shorting the cell through an external load, fuel oxidises at the anode resulting in the release of electrons which flow through the external load and reduce oxygen at the cathode. The charge flow in the external circuit is balanced by ionic current flows within the electrolyte. Thus, at the cathode oxygen from the air or other oxidant is dissociated and converted to oxygen ions which migrate through the electrolyte membrane and react with the fuel at the anode/electrolyte interface. The voltage from a single cell under load conditions is in the vicinity of 0.6 to 1.0 V DC and current densities in the range 100 to 500 $MAcm^{-2}$ can be achieved.

Several different types of fuel cells are under development. Amongst these, the solid oxide fuel cell (SOFC) is regarded as the most efficient and versatile power generation system, in particular for dispersed power generation, with low pollution, high efficiency, high power density and fuel flexibility.

Single fuel cells are connected via interconnects to form multi-cell units, termed fuel cell stacks. Gas flow paths are provided between the interconnects and respective electrodes. Numerous SOFC configurations are under development, including the tubular, the monolithic and the planar design. The planar or flat plate design is the most widely investigated. In this concept the components— electrolyte/electrode laminates and interconnect plates, which may have gas channels formed therein—are fabricated individually and then stacked together and sealed with a high temperature sealing material to form either a fixed or sliding seal. With this arrangement, external and internal co-flow, counter-flow and cross-flow manifolding options are possible for the gaseous fuel and oxidant.

Apart from good electrical, electrochemical, mechanical and thermal properties, the individual cell components must be stable in demanding fuel cell operating environments. SOFCs operate in the vicinity of 950–1000° C. although substantial efforts are under way to reduce the operating temperatures to 800–900° C. For fuel cells to be economical, typical life times of 5–6 years of continuous operation are desired. Thus long term stability of the various cell components is essential. Only a few materials are likely to fulfil all the requirements. In general, the high operating temperature of SOFCs, the multi-component nature of the fuel cell and the required life expectancy of several years severely restricts the choice of materials for cells and manifold components.

A typical solid oxide electrolyte material used in an SOFC is $Y_2O_3$-doped $ZrO_2$ which is an oxygen ion conductor. However, many other materials have been proposed, and the invention is applicable to all of these. A variety of different anode materials have been proposed for use at the fuel side of SOFCs, but the particular anode material is not relevant to the present invention. However, nickel-containing anodes are preferred. Such anodes have included nickel plating layers and nickel alloys, but the presently most preferred material is a $Ni/ZrO_2$ cermet. Likewise, a variety of different cathode materials have been proposed for the air side of SOFCs, but the particular cathode material is not relevant to the present invention. However, the presently preferred cathode material is strontium doped lanthanum manganite ($LaMnO_3$) (LSM).

The purpose of the interconnect between individual fuel cells, as well as at each end of a fuel cell stack and at each side of a single fuel cell, is to convey electrical current away from the fuel cell and/or between adjacent fuel cells and heat away from the fuel cell or cells. To this extent an interconnect should have a relatively high electrical conductivity, which is preferably only electronic or at least primarily electronic, to minimise voltage losses, with negligible contact resistance at the interconnect/electrode interface. It should also have a relatively high thermal conductivity to provide improved uniformity of heat distribution and to lower thermal stresses. A thermal conductivity above 25 W/m K is desirable. In addition, since an intermediate interconnect in a fuel cell stack extends between the anode of one fuel cell and the cathode of the adjacent fuel cell, the interconnect must be impervious to gases in order to avoid mixing of the fuel and the oxidant. Thus, it should have a relatively high density with no open porosity, as well as stability in both oxidizing and reducing environments at the operating temperature. The interconnect should also have high creep resistance so that there is negligible creep at the operating temperature, and a low vapour pressure. The interconnect should further have phase stability during thermal cycling, a low thermal expansion mismatch between cell components, as well as chemical stability with respect to components with which it is in contact. The interconnect should also preferably have reasonable strength, since it may provide structural support, as well as low cost, ease of fabrication and low brittleness.

Ceramic, cermet and alloy interconnects have been proposed. Metallic materials have the advantages generally of high electrical and thermal conductivities and of being easier to fabricate. However, stability in a fuel cell environment, that is high temperatures in both reducing and oxidizing atmospheres, limits the number of available metals that can be used in interconnects. Most high temperature oxidation resistant alloys have some kind of built-in protection mechanism, usually forming oxidation resistant surface layers. Metallic materials commonly proposed for high temperature applications include, usually as alloys, Cr, Al, and Si, all of which form protective layers. For the material to be useful as an interconnect in solid oxide fuel cells, any protective layer which may be formed by the material in use must be at least a reasonable electronic conductor. However, oxides of Al and Si are poor conductors. Therefore, alloys which appear most suitable for use as metallic interconnects in SOFCs, whether in cermet or alloy form, contain Cr in varying quantities.

Cr containing alloys form a layer of $Cr_2O_3$ at the external surface which provides oxidation resistance to the alloy. The formation of a $Cr_2O_3$ layer for most electrical applications is not a problem as it has acceptable electrical conductivity. However, for solid oxide fuel cell applications, a major problem appears to be the high vapour pressure and therefore evaporation of oxides and hydroxyoxides of Cr ($Cr^{6+}$) on the cathode (air) side of the fuel cell at the high operating temperatures. At high temperatures oxides and hydroxyoxides of Cr ($Cr^{6+}$) are stable only in the gas phase and have been found to react with the air electrode material leading to the formation of new phases and to deposits of $Cr_2O_3$ on the electrolyte. These very quickly reduce electrode activity to the oxygen reduction reaction at the electrode/electrolyte interface and thereby considerably degrade the electrochemical performance of the cell.

It has been attempted to alleviate this problem of degraded electrochemical performance by coating the air electrode side of the interconnect with LSM, which may be the material of the air electrode, but while short term performance is maintained there is a long term degradation which is not acceptable.

SUMMARY OF THE INVENTION

It is an object of the present invention to alleviate evaporation of $CrO_3$ from the cathode-side of a chromium-containing interconnect of a fuel cell and thereby provide extended electrochemical activity at the air electrode/electrolyte interface.

According to the present invention there is provided an electrical interconnect device for a planar fuel cell comprising solid oxide electrolyte, an anode, and a cathode, wherein the interconnect device comprises a plate-like chromium-containing substrate having oxidant gas-flow channels on the cathode-side and a coating on said cathode-side, the coating comprising an oxide surface layer comprising at least one metal M selected from the group Mn, Fe, Co and Ni and an M, Cr spinel layer intermediate the substrate and the oxide surface layer.

Further according to the present invention there is provided a planar fuel cell assembly including a fuel cell comprising solid oxide electrolyte, a cathode and an anode, and an interconnect device substantially as described in the immediately preceding paragraph in electrical contact with the cathode.

Preferably, the coating is at least substantially fully dense, that is substantially without open pores which would permit gaseous mass transfer of chromium oxide and oxygen.

The present invention provides self-healing protection for the air electrode/electrolyte interface from the interfering effect of chromium oxide derived from the interconnect device. The intermediate spinel layer of the coating is formed by chemical reaction of M-metal oxide with the $Cr_2O_3$ (and/or $CrO_3$) formed at the interconnect surface and resists the evaporation of $CrO_3$ from the cathode surface of the interconnect. Thus, the intermediate spinel layer assists in binding in chromium oxide from the substrate surface. The coating also alleviates continued growth of the chromium oxide substrate surface layer which may otherwise occur under oxidizing conditions and would lead to increased electrical contact resistance at the interconnect cathode junction. The overlying M oxide surface layer (between the intermediate spinel layer and the cathode in the fuel cell assembly) acts as a buffer in case spalling occurs or cracks appear in the intermediate spinel layer, or if there is some open porosity in the intermediate spinel layer, whereby further spinel will form in use should $CrO_3$ come into contact with the oxide surface layer.

Generally, the Cr content of the spinel layer decreases with increasing distance from the substrate through the thickness of the coating.

While M has been identified as one or more of Mn, Fe, Co and Ni, it is preferred in order to ensure stability with the air electrode material, but not essential, that the cathode in the fuel cell assembly also comprises an M-metal oxide. Thus, for the presently preferred cathode material, strontium doped lanthanum manganite (LSM), the most suitable M-metal in the coating on the surface of the chromium-containing interconnect is Mn which as $MnO_x$ exists mainly as a spinel $Mn_3O_4$ oxide in air in the vicinity of 900 to 1100° C. The oxide is chemically stable with respect to LSM at the solid oxide fuel cell operating temperature, but it has a large affinity for Cr and on reaction with $Cr_2O_3$ or $CrO_3$ forms an intermediate layer of an Mn, Cr spinel with a wide composition range. The stability range for the Mn, Cr spinel of the general formula $Mn^{2+}(Mn_xCr_{1-x})_2^{3+}O_4$ extends from $Mn_3O_4$ [i.e. $Mn^{2+}(Mn^{3+})_2O_4$] with x=1 to $MnCr_2O_4$ with x=0.

The coating preferably has a thickness range of from about 1 to about 100 microns, more preferably about 1 to about 50 microns, for example about 20 microns. The intermediate spinel layer, as part of the coating, may have a thickness in the range, for example, from less than 1 to about 20 microns, preferably about 1 to about 5 microns.

The coating may be provided only on the cathode-contacting surfaces of the cathode-side of the substrate. Thus, the coating need not be provided in, for example, the oxidant gas flow channels on the cathode-side, although it may be advantageous to do so.

The chromium-containing substrate of the interconnect device may be formed of, for example, an alloy or a cermet. Such a cermet may be a combination of Cr and Ni with a ceramic such as $Al_2O_3$ or $ZrO_2$, for example Inconel/alumina. Possible alloy materials are the Siemens-Plansee alloy, Haynes 230 alloy and high temperature alloys such as Nicrofer, Inconel, ferritic steels and other chromium containing steels. The preferred interconnect device substrate materials are alloys which have a thermal expansion coefficient closely matching those of the other fuel cells components (ranging from 10.5 to $13.0 \times 10^{-6} K$). These include the Siemens-Plansee alloy (94 wt % Cr, 5 wt % Fe and 1 wt % $Y_2O_3$) and ferritic steels.

It may be possible to dope the chromia protection layer on the interconnect substrate to improve properties such as electrical conductivity of the protection layer. Possible doping materials comprise one or more metals selected from the group Mn, Fe, Cu, Ni, Co, Ti, V, Mg, Li and rare earth metals.

As noted hereinbefore, the preferred cathode material in the fuel cell assembly is strontium-doped lanthanum manganite. While other materials may also be suitable, the cathode material will generally have a perovskite-type structure of the general formula RX03 where R is a rare earth metal or a mixture of any of these, optionally doped (for example with Sr, Ca, Mg, Zn and Ba), and X is selected from one or more of the group of metals Mn, Fe, Co, Ni and Cr. Another example of a material having such a structure is yttrium manganite, which may also be doped.

Advantageously the intermediate spinel layer is formed by partial reaction with surface chromium oxide on the substrate of an M-metal oxide coating which will also form the oxide surface layer, and still further according to the present invention, there is provided a method of preparing an electrical interconnect device in accordance with the invention which comprises coating the cathode-contacting surface of the chromium-containing substrate with one or more materials selected from the group comprising at least one M-metal oxide, at least one M-metal salt and at least one M-metal, subjecting any M-metal salt and M-metal to oxidation to produce an M-metal oxide coating, and partially reacting the M-metal oxide coating with surface chromium oxide on the cathode-contacting surface of the chromium-containing substrate to form the M, Cr spinel layer intermediate the substrate and the M-metal oxide surface layer.

The coating material can be applied to the interconnect surface by any one of several methods, including painting an oxide slurry carried in an organic or inorganic media; slurry spraying the oxide onto a hot or cold substrate; spray pyrolysis of an M-metal salt onto a hot substrate; flame spraying; solution spraying; flow coating; dipping the substrate into an M-metal salt and heating (may need to be repeated to obtain suitable thickness); screen printing; electrolytic deposition, electro-phoretic deposition; physical or chemical evaporation from an oxide target; sputtering (eg RF) of an oxide layer from a target; electrostatic spraying; plasma spraying; laser techniques; deposition of the metal, for example by electroplating, electroless plating, sputtering (eg DC magnetron), evaporation or slurry coating, followed by oxidation at higher temperatures; and ion beam evaporation.

Some of the above methods of applying the coating material are more appropriate than others depending on the composition of the material applied to the substrate, as will be readily recognized by those skilled in the art. Furthermore the other steps or procedures of the aforementioned method of preparing the interconnect may vary with the particular application method and material.

Using high temperature M-metal oxide coating methods, for example at about 500° C. or greater, the oxide coating material may partially react with the chromium oxide surface layer on the interconnect to form the M, Cr spinel intermediate layer as it is applied. In other cases using M-metal oxide coating methods, it may be necessary to form the intermediate spinel layer by subjecting the coated interconnect surface to heat treatment at an elevated temperature, for example in a temperature range of about 500 to about 1150° C.

When the coating material comprises one or more of the M-metal salt and M-metal, the oxidation of the coating material to produce the M-metal oxide coating and the partial reaction of the M-metal oxide coating may advantageously be performed concurrently by a heat treatment at elevated temperature, for example in a temperature range of about 500 to about 1150° C.

For better control of density, morphology, adherence and microstructure of coatings, either of the aforementioned heat treatments may be at a controlled oxygen partial pressure using, for example, pure oxygen, air, air-water, oxygen-water, nitrogen, argon, hydrogen/nitrogen, hydrogen/argon, hydrogen/water or any combination of these.

Cleaning the interconnect surface, for example by etching, polishing/grinding etc., prior to application of the coating material, may improve the quality of the coating by improving the quality of the surface $Cr_2O_3$ layer, optionally followed by controlled scale formation by pre-oxidation in a controlled environment, i.e. a controlled oxygen partial pressure. Similarly, the quality of the chromium oxide surface layer (density, adherence, morphology, microstructure) may be improved by heat treating the interconnect substrate in contact with a rare earth oxide (for example lanthana, yttria) at a controlled oxygen partial pressure.

The M-metal oxide coating should be electrically conductive and stable with respect to the air electrode material, but reactive with the chromium oxide surface layer on the interconnect. The coating material may comprise mixed metals (oxides) or be doped to improve one or more parameters such as electrical conductivity and/or phase stability. For example, the coating material may comprise a mixture of two metals M, such as Ni and Mn, Co and Mn, and Fe and Mn. Alternatively or in addition, the oxide coating may comprise a mixture of the at least one M-metal oxide and a non-M metal oxide, which may be in oxide form prior to applying the coating material to the substrate. An example of such a non-M metal is Cu and a particular example of a mixed metal oxide coating is $CuNiMnO_x$.

One or more dopants may be incorporated in the oxide coating, for example by mixing a dopant material with the coating material prior to application to the substrate or by coating a layer of dopant material on the cathode-contacting surface of the chromium-containing substrate prior to application of the coating material thereto. The dopant material may comprise, for example, at least one metal selected from the group Mn, Fe, Cu. Ni, Co, Cr, Ti, V and Mg. When the dopant material is mixed with the coating material it may be in, for example, metallic or oxide form, but when the dopant material is applied as a pre-coating it will generally be applied in metallic form. Pre-coating of the dopant material may be by any appropriate one of the methods described above for the coating material. The dopant level is preferably in the range of about 0.1 to about 20%, more preferably to about 10%, by weight of the at least one metal M. When the dopant material is applied as a pre-coating it may advantageously have a thickness in the range about 0.01 to about 20 microns, preferably about 0.1 to about 10 microns. Too thick a layer of dopant material may lead to spalling.

When the dopant material is applied to the substrate as a pre-coating, it is believed to migrate through the oxide coating material, and therefore throughout the spinel layer and oxide surface layer, on heating. It is not fully understood why the addition of the dopant material improves parameters such as electrical conductivity of the interconnect cathode-side but, without wishing to be bound by any theory, it is possible that at least a substantial part of the improvement is due to migration of the dopant to the chromium oxide surface layer on the interconnect.

The coating material may be mixed with inert oxide filler, for example one or more of alumina and zirconia.

BRIEF DESCRIPTION OF THE DRAWINGS

The present invention will be further described by way of example only with reference to the accompanying drawings in which.

DETAILED DESCRIPTION OF THE DRAWINGS

Figure 1:
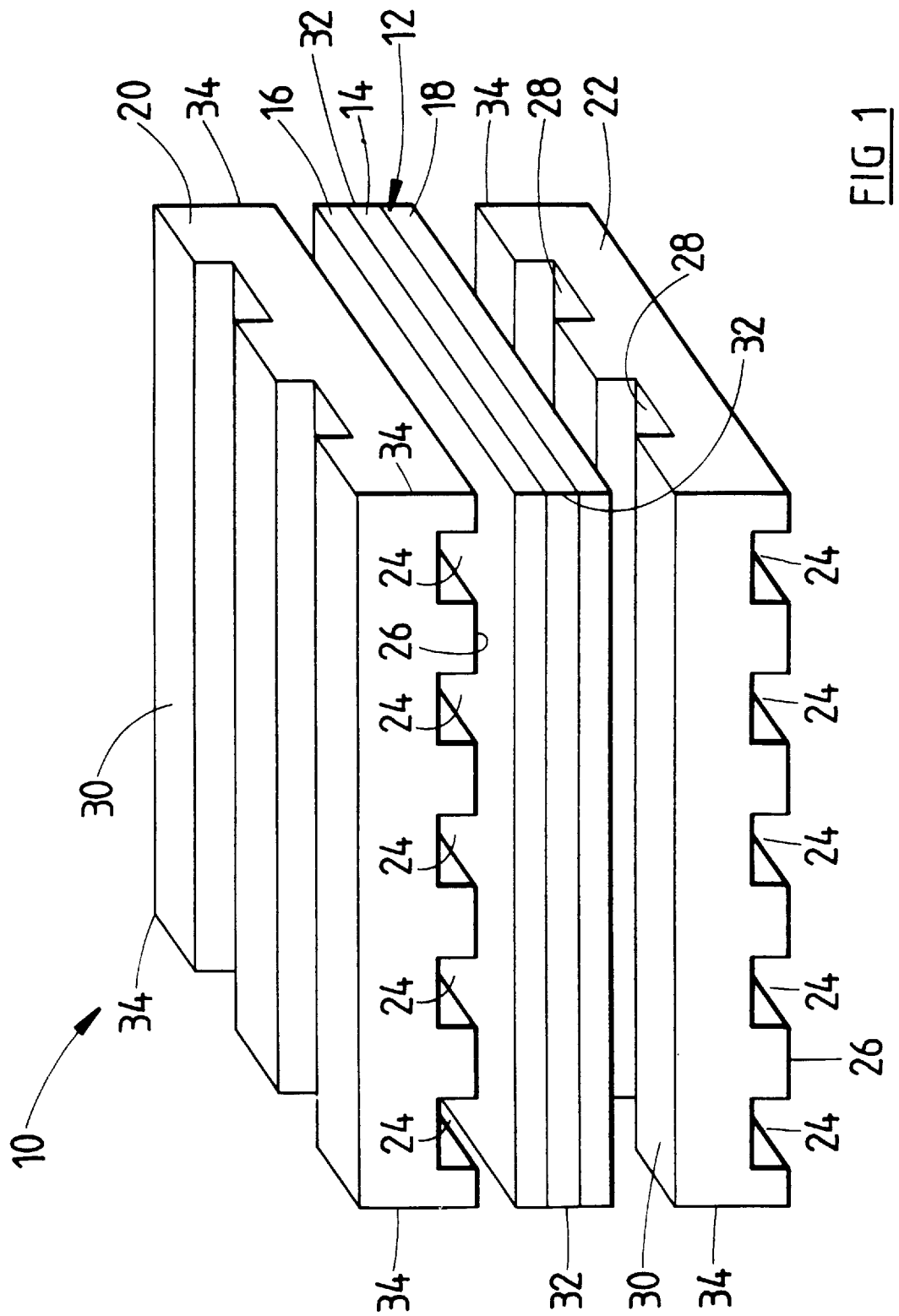
FIG. 1 is an exploded perspective view of a fuel cell assembly.

The fuel cell assembly 10 shown in exploded form in FIG. 1 has a typical structure which may be used in the present invention. As illustrated, the structure is known and will therefore not be described in detail. The assembly comprises a planar fuel cell 12 comprising a solid oxide electrolyte central layer 14 with an integral anode layer 16 overlying one face of the electrolyte and an integral cathode layer 18 overlying the opposite face of the electrolyte. The electrode layers may be applied by known screenprinting techniques. The fuel cell is sandwiched between a pair of interconnects 20 and 22 which in use are in face to face contact with the anode 16 and cathode 18 respectively.

The interconnects 20 and 22 shown in FIG. 1 are identical with an array of gaseous fuel channels 24 extending across the underside 26 and an array of gaseous oxidant flow channels 28 extending across the top side 30. The channels 24 and 28 are shown extending at right angles to each other but they may extend parallel and the respective gas flow directions may then be the same or opposite depending upon the manifolding arrangements. By providing the gas flow channels on both sides, the interconnects 20 and 22 may be used to form a fuel cell stack in which an identical fuel cell 12 overlies the interconnect 20 and another identical fuel cell 12 underlies the interconnect 22. Further identical interconnects may then be placed adjacent the opposite sides of the further fuel cells, and so forth to build up a fuel cell stack of the desired number of fuel cells. The interconnects provided at the ends of the stack need only have one of the arrays of gas channels, gas channels 24 for the interconnect at the top of the stack as described and gas channels 28 for the interconnect at the bottom of the stack as described. Likewise in a fuel cell assembly comprising only a single fuel cell 12 the proposed interconnects need only have the respective array of gas channels on the face in contact with the fuel cell. These end interconnects are commonly termed end plates.

In use, the gaseous fuel and oxidant flows must be kept apart and suitable manifolding (not shown) is provided to ensure this. In the cross flow arrangement illustrated this is conveniently provided by an inert cylindrical sleeve, for example of ceramic, which extends around the fuel cell stack with its axis normal to the gas flow channels 24 and 28 and with the corners 32 of the fuel cells 12 and the corners 34 of the interconnects sealed in contact with the annular inner surface of the sleeve. The fuel cell assembly is completed by terminals on the top and bottom end plate interconnects for attachment of the fuel cell or fuel cell stack to an external load.

As noted already, the fuel cell assembly 10 is known and in the described embodiment the fuel cell 12 comprises a solid oxide electrolyte 14 of $Y_2O_3$-doped $ZrO_2$ as an ionic conductor while the electrodes 16 and 18 are at least primarily electronic conductors with the anode 16 comprising an $Ni/ZrO_2$ cermet and the cathode 18 comprising LSM.

In the described embodiment the impervious interconnects 20 and 22 are formed of the Siemens-Plansee alloy comprising 94 wt % Cr, 5 wt % Fe and 1 wt % $Y_2O_3$. A chromium oxide layer (not shown) forms naturally, under oxidizing conditions, on the surface of the alloy, although the surface oxidation may be controlled as previously described herein. The purpose of the interconnects is to convey electrical current between adjacent fuel cells, and to convey heat away from the fuel cells. However, at the operating temperature of 800° C. to 1000° C. of the described embodiment, oxide and hydroxyoxides of Cr ($Cr^{6+}$) evaporate from the interconnect chromium oxide surface layer adjacent the cathode, react with the cathode material and form deposits at the electrolyte/cathode interface, resulting in substantial cell performance degradation with time.

Figure 2:
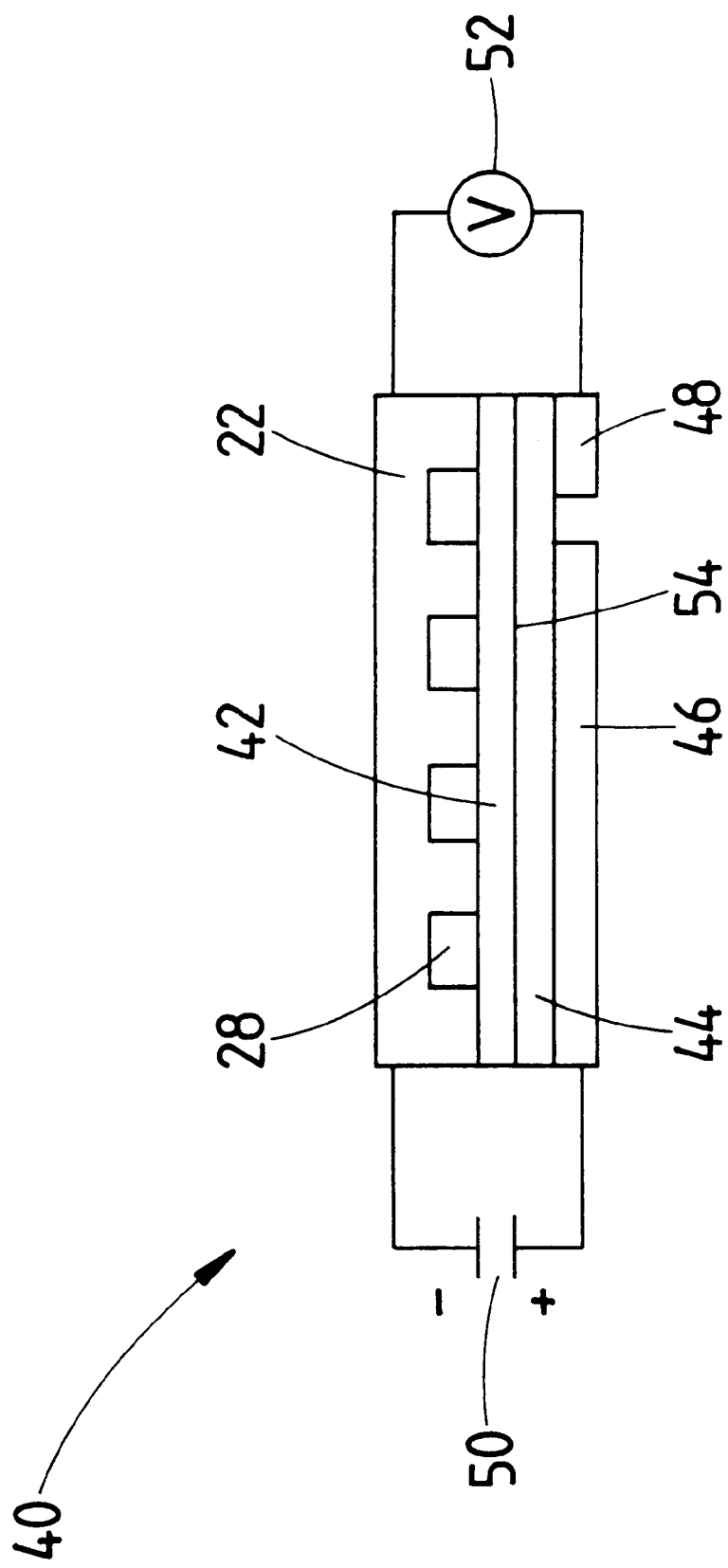
FIG. 2 is a schematic illustration of a cell arrangement for polarisation measurements.

It has been found that polarisation measurements are ideal for investigation of the interference by chromium oxide occurring at the electrode/electrolyte interface. The cell arrangement 40 used to determine polarisation measurements is shown in FIG. 2. The cell comprises a Siemens-Plansee alloy interconnect 22 having a thickness of 2.5 mm and a protective surface layer (not shown) of chromium oxide. The cathode-side with the air channels 28 is contacted with an LSM layer 42 screen printed onto an yttria-zirconia electrolyte disc 44 with Pt counter and reference electrodes 46 and 48, respectively, screenprinted on the opposite side. Current is passed through the cell 40 from a constant current source 50 and the voltage is monitored by a voltmeter 52 connected between the interconnect and the reference electrode.

Figure 3:
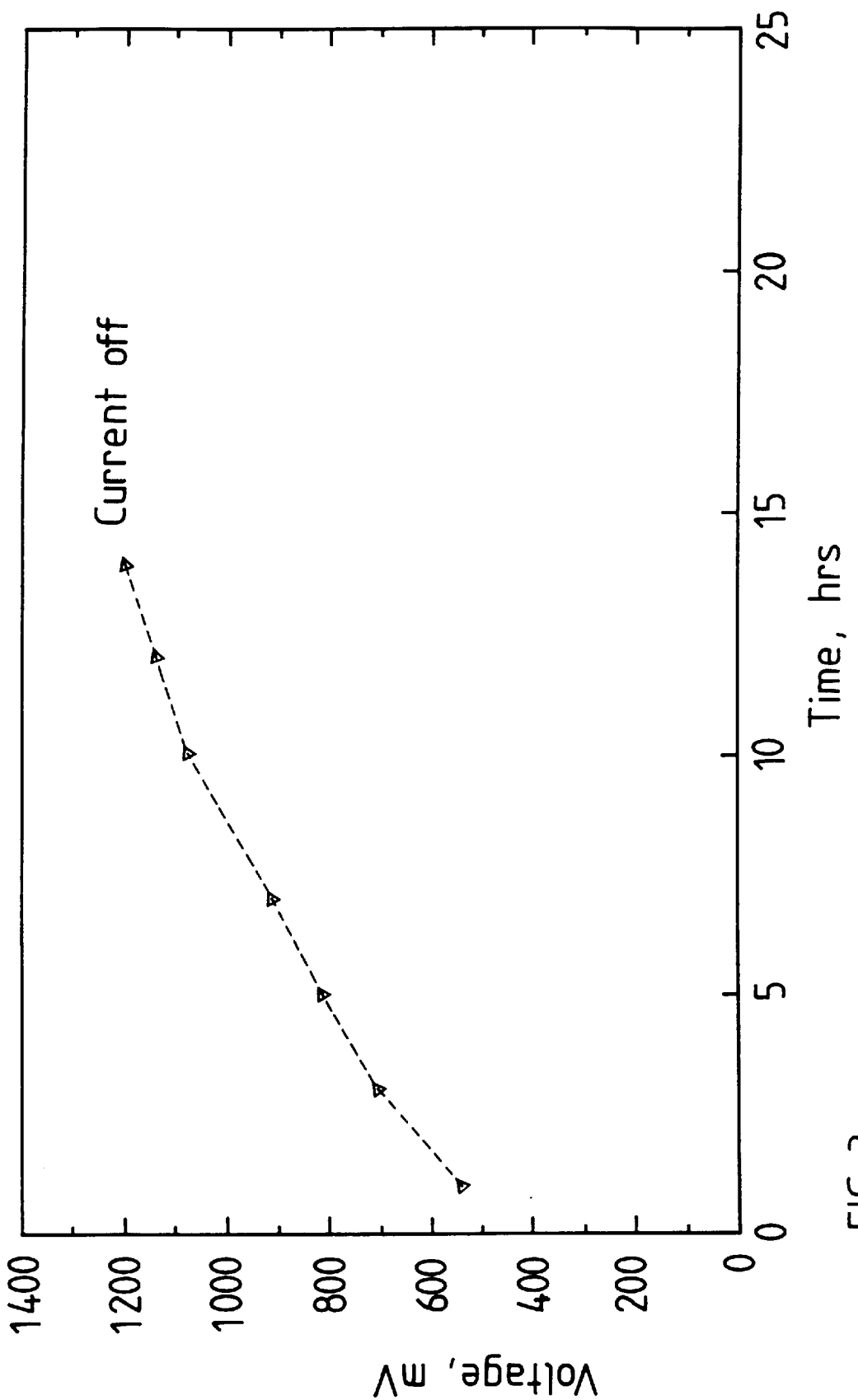
FIG. 3 is a graph showing polarisation measurements over a period of time for a first cell in accordance with FIG. 2 but having direct contact between a chromium oxide surface protective layer of the Cr containing interconnect material and the LSM electrode material.

FIG. 3 is a graph of voltage against time showing polarisation measurements for the cell 40 in which the disc 44 of LSM coated yttria-zirconia is in direct contact with the chromium oxide surface layer of the interconnect 22 at a current density of 100 $mA/cm^2$ and a temperature of 1000° C. As may be seen in FIG. 3, the voltage across the LSM/yttria/zirconia interface 54 increased over 15 hours from approximately 540 mV to 1200 mV, illustrating a substantial polarisation effect due to the formation of $Cr_2O_3$ at the interface from vapour transported $CrO_3$.

For conducting polarisation measurements on interconnects in accordance with the invention, the contact surface of the interconnect 22 to be tested in the cell of FIG. 2 is coated with a dense oxide surface layer (not shown) prior to being pressed together with the LSM layer of the yttria-zirconia disc, as described in the following examples. All of these examples include Mn as the M-metal or one of the M-metals but it will be appreciated by those skilled in the art from a reading of this specification that Mn may be replaced in whole or in part by one or more of Fe, Co and Ni, all of which form spinels with chromium.

EXAMPLE 1

The interconnect cathode surface was coated with $MnO_x$ to a thickness of about 20 microns by spray pyrolysis. In this general method salts (commonly nitrates of the metals) are dissolved in a suitable solvent (water, water/alcohol, others) and sprayed onto a hot substrate (100–600° C.). The thickness of the layer is determined by the solution concentration, the spray nozzle dimensions and the number of passes. In this particular example a Mn-nitrate solution in water was sprayed onto a hot interconnect plate (500° C.) to achieve a coating thickness of about 20 microns. After coating the plate was heated in air at 1000° C. for 50 hours. Under these conditions a layer of the $MnO_x$ coating adjacent the $Cr_2O_3$ surface layer of the interconnect reacted with the surface layer to form an Mn—Cr spinel having a gradually reducing Cr content with increasing distance away from the $Cr_2O_3$ surface layer. This intermediate spinel layer had a thickness of about 5 microns (the thickness may be expected to be in the range of 1–20 microns depending on the treatment temperature and time) as measured by scanning electron microscopy and X-ray diffraction. The $MnO_x$ coating formed by spray pyrolysis was not fully dense and had some open porosity.

EXAMPLE 2

Figure 4:
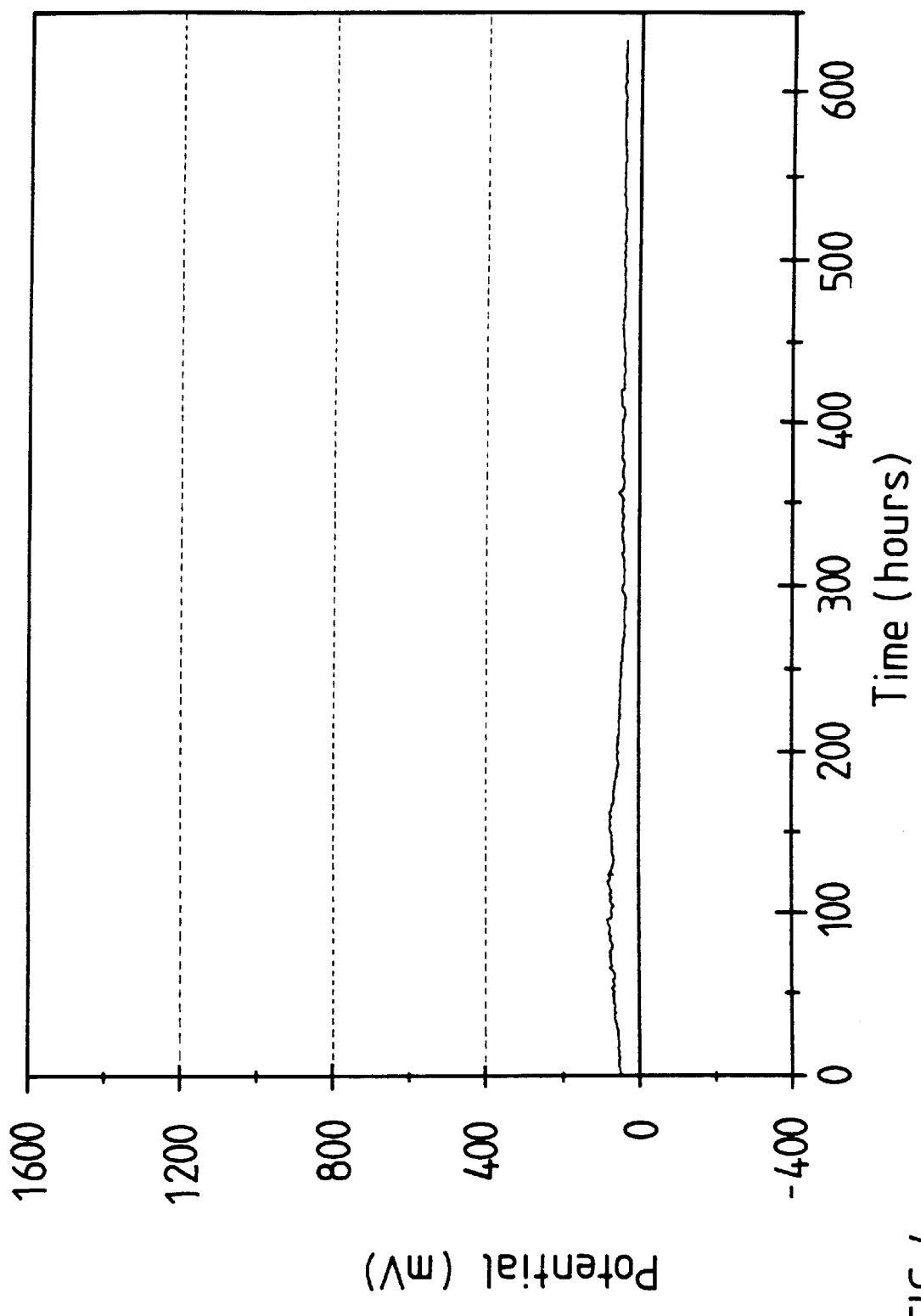
FIG. 4 is a graph showing polarisation measurements for a coated interconnect in accordance with Example 2.

Polarisation measurements on the coated interconnect described in Example 1 were conducted in the cell 40 and under the same conditions as for the uncoated substrate described with reference to FIG. 2. The results are illustrated in FIG. 4 from which it may be seen that, in contrast to FIG. 3, there was no marked increase in polarisation voltage over the test period of over 600 hours.

EXAMPLE 3

Figure 5:
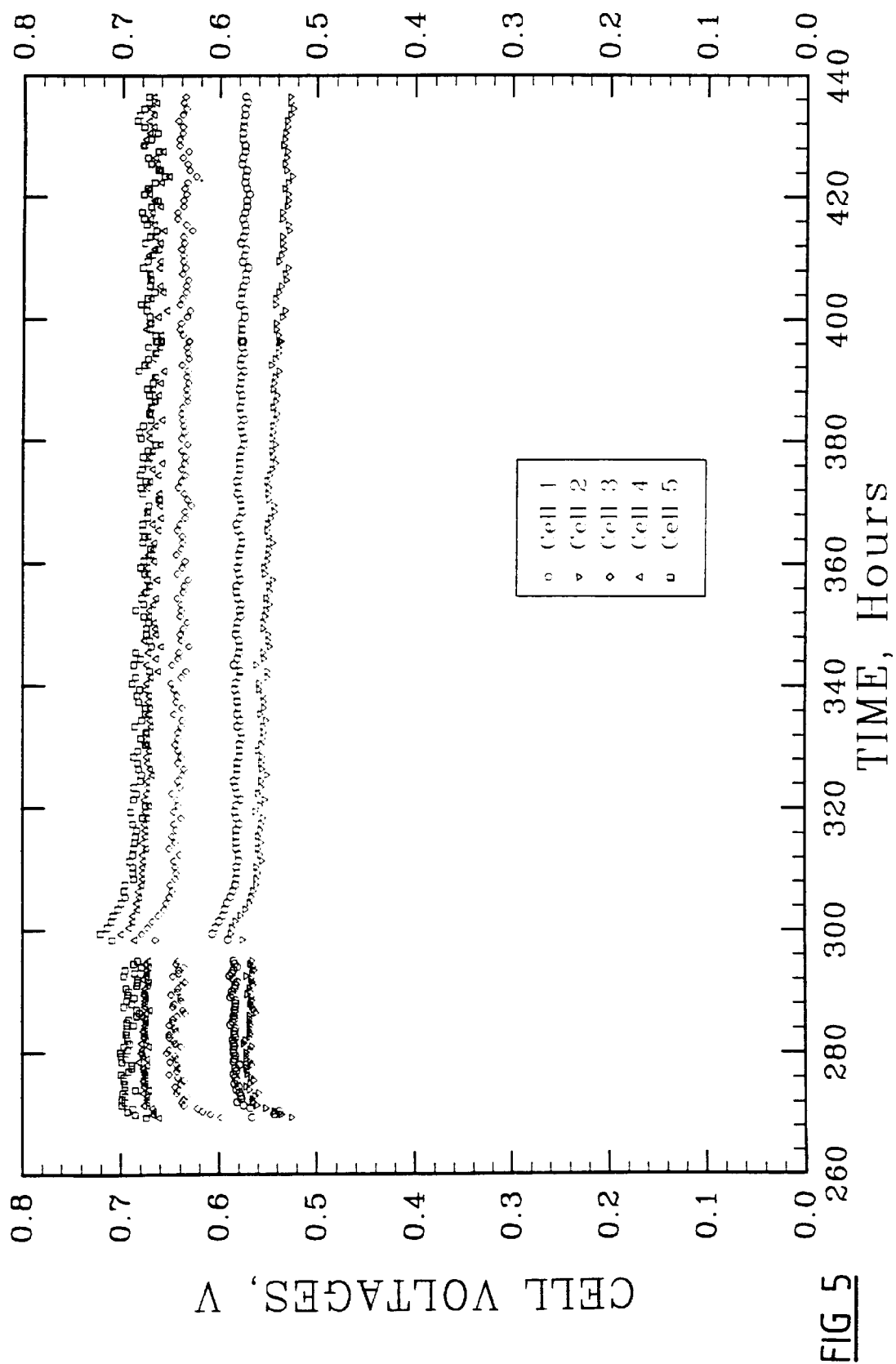
FIG. 5 is a graph illustrating the stability of a fuel cell stack of 5 cells separated by coated interconnects in accordance with Example 3.

A five-cell SOFC stack in which the interconnect plates were coated on the air side in accordance with Example 1 was operated for over 400 hours to ascertain the stability of the cell output. The fuel cell and interconnect structures are as described with reference to FIG. 1. In each fuel cell a 150 micron electrolyte layer of three mol % yttria-zirconia was sandwiched between 50 micron thickness electrode layers applied by screenprinting. The cathode comprised LSM while the anode comprised a nickel-3 mol % yttria-zirconia cermet. The fuel cell stack was provided with appropriate manifolding and sealed and operated at a temperature of 930° C. with 98% hydrogen/2% water as the fuel and air as the oxidant. The voltage output of each of the five cells is shown in FIG. 5, from which it may also be seen that the output was stable over the test period of 440 hours.

EXAMPLE 4

Figure 6:
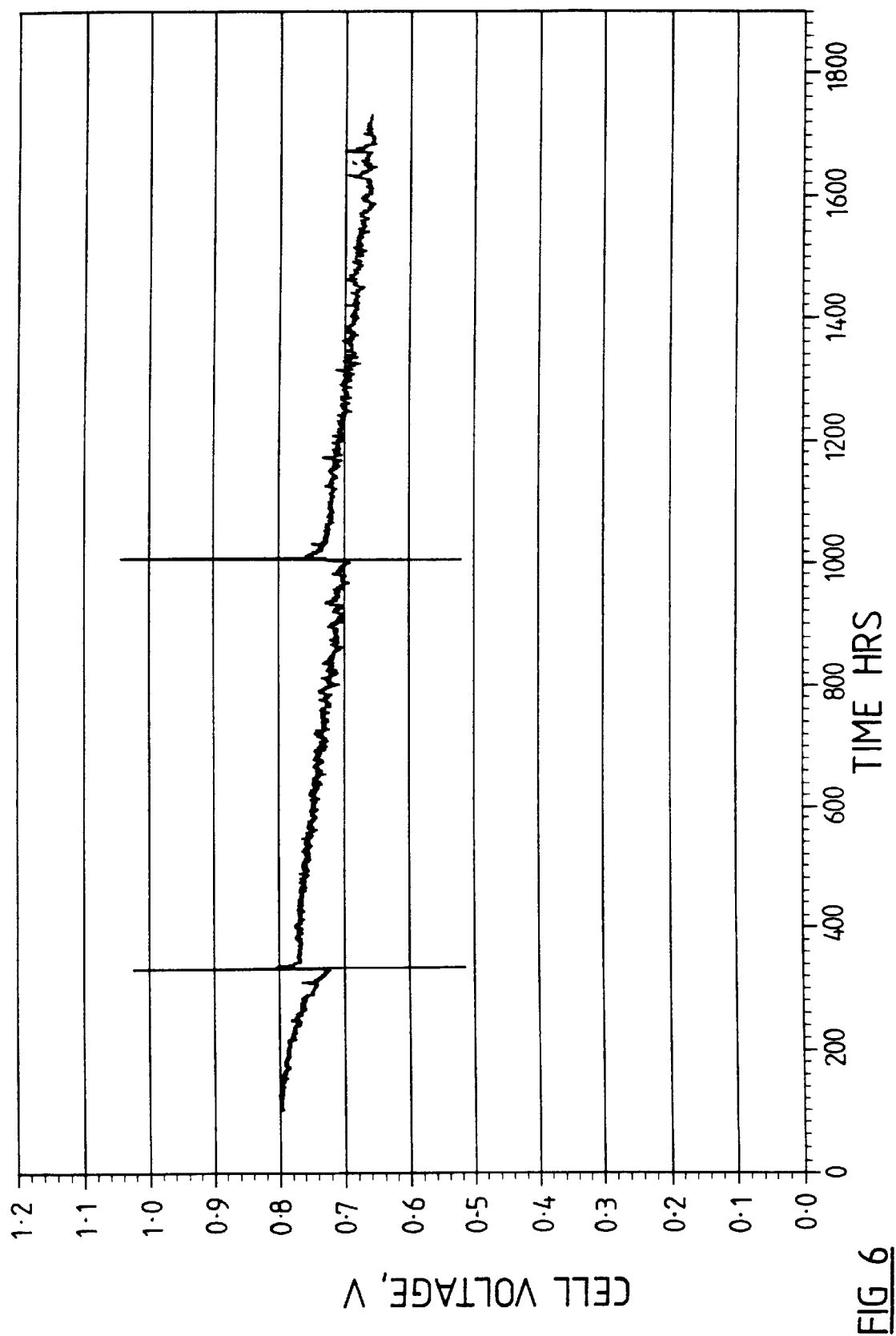
FIG. 6 is a graph showing voltage output over time for the single cell stack in accordance Example 4.

The end plate of a single fuel cell stack was coated on the air side with a 5 micron thick $MnO_x$ layer by sputtering from an Mn-oxide target onto the interconnect plate (water cooled). After deposition, the plate was heated at 1000° C. for 50 hours in flowing hydrogen gas saturated with water at room temperature to form an intermediate Mn, Cr spinel layer. The coated air end plate was then assembled with a cell comprising a 100 micron YSZ electrolyte sheet, sandwiched between 50 micron electrodes (LSM, Ni-YSZ cermet) and a fuel endplate, manifolded for air and fuel flow and tested at 930° C. Over the test period of 1700 hours the stack showed good stability as demonstrated in FIG. 6.

It is preferable to have a fully dense oxide surface and spinel intermediate layer on the interconnect cathode-side, and deposition methods, optionally in combination with post-deposition treatment which are able to yield dense layers, are preferred. The following Examples 4–12, 14 and 15 demonstrate only a limited number of deposition procedures and not necessarily the optimum ones. The coating thicknesses produced were about 20 microns unless otherwise specified.

EXAMPLE 5

A manganese nitrate solution at a concentration of 2.0 M/l was sprayed onto the chromium oxide surface layer of hot (450–500° C.) substrates of Siemens-Plansee alloy with an air gun. The oxide layers produced by this method were from 15 to 25 microns thick. The substrates were heated at 900° C. in air, nitrogen or hydrogen/water.

EXAMPLE 6

The surface layer of a Siemens-Plansee alloy substrate was modified by coating the surface with La-oxide and heat treating in air or controlled atmosphere with defined oxygen partial pressure (hydrogen saturated with water at room temperature) at 1000° C. for 24 hours. An Mn-oxide coating was subsequently deposited onto this modified surface in accordance with Example 5.

EXAMPLE 7

The metallic surface of a Siemens-Plansee alloy substrate was modified by controlled pre-oxidation at a defined oxygen partial pressure (in a hydrogen stream saturated with water at room temperature) at temperatures above 900° C. to give a controlled chromium oxide surface layer. An Mn-oxide coating was subsequently deposited onto this modified surface as described in Example 5.

EXAMPLE 8

The surfaces of Siemens-Plansee alloy substrates, untreated or modified as described in Examples 6 and 7, were coated with Mn-oxide by slurry painting and firing at temperatures above 900° C. in air. The slurry was prepared by milling manganese oxide powder with a solvent and binder to uniform consistency for application by a paintbrush. Coating thicknesses between 5 and 100 $\mu$m were achieved depending on slurry viscosity and application. Other application methods used were slurry spraying and slurry dipping.

EXAMPLE 9

The surfaces of Siemens-Plansee alloy substrates, untreated or modified as described in Examples 6 and 7, were coated with Mn-oxide by RF-sputtering at the rate of 1–2 microns per hour to a thickness between 5–10 microns, followed by heat treatment at 900° C. in air.

EXAMPLE 10

Mn metal was deposited on the surfaces of Siemens-Plansee alloy substrates by magnetron sputtering, electroplating and electroless plating, respectively, and then converted to $MnO_x$ by controlled oxidation at 900° C. in air.

EXAMPLE 11

An $MnO_x$ coating was deposited on the surface of a Siemens-Plansee alloy substrate by electrolytic deposition and fired above 900° C. in air.

In Examples 4–11, the heat treatment in air or in controlled atmospheres of the specimen after deposition of the Mn-based coating on the alloy substrate leads to the formation of an Mn—Cr—O spinel interface between the Mn-oxide surface layer and the Cr-based alloy which reduces further Cr evaporation and chromium oxide surface formation, and which thereby prolongs fuel cell life as shown in Examples 3 and 4.

The following Examples illustrate the use of oxide coatings in accordance with the invention in which mixed M-metals are applied (in metallic and/or oxide form) to the interconnect substrate and in which the M-metal (oxide) is doped. The coatings are Mn based, but contain the other components primarily for increased electrical conductivity, that is lower resistive losses. The dopant(s) may be introduced to the coating in any of a variety of ways and some of the combinations are illustrated schematically in FIG. 7.

In FIG. 7 the interconnect Siemens-Plansee alloy substrates are illustrated at 60 and may be pre-treated as previously described herein.

Figure 7A:
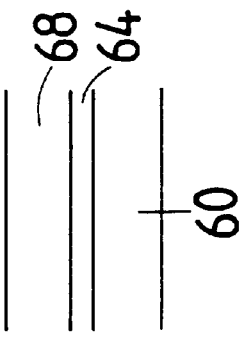
FIGS. 7(a)–7(f) illustrate schematically six interconnect substrates, each having a different coating layer or layers whereby the oxide coating will either be doped or comprise a mixture of M metals.

In FIG. 7a, a layer 62 of manganese oxide mixed with dopant oxide (0.1 to 20% by weight) is applied to the interconnect surface.

Figure 7B:
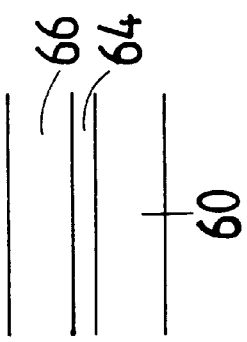
Figure 7C:
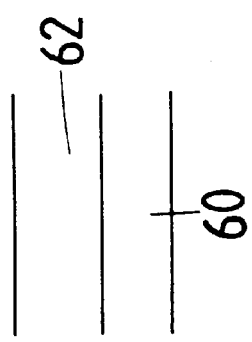
Figure 7D:
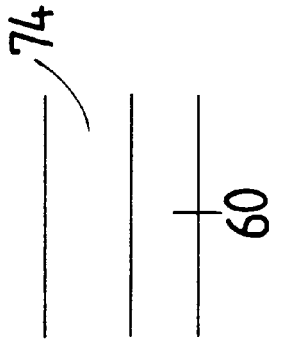

In FIGS. 7b, 7c and 7d an initial layer 64 of dopant metal is applied to the surface of the interconnect 60, followed in the case of FIG. 7b by a layer 66 of manganese oxide, in the case of FIG. 7c by a layer 68 comprising a mixture of manganese oxide and manganese metal, and in the case of FIG. 7d by a layer 70 of manganese metal alone. In FIGS. 7b, 7c and 7d the dopant metal may be applied at the rate of 0.1 to 20% by weight of the manganese coating material, and the layer of dopant metal, for example nickel, will have a corresponding thickness.

Figure 7E:
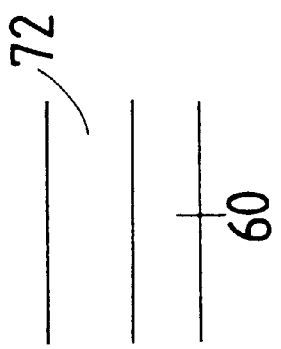
Figure 7F:
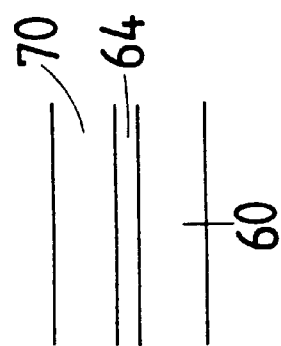

In FIG. 7e, a coating layer 72 comprising manganese metal mixed with dopant metal such as Nickel at the rate of 0.1 to 20% by weight of the manganese metal is applied to the interconnect substrate 60. In FIG. 7f a mixture of manganese metal and manganese oxide with nickel oxide dopant (0.1 to 20%) is applied as a layer 74 to the interconnect substrate 60.

The various layers described with reference to FIG. 7 may be applied by any of the appropriate methods previously described herein, but any application method at low temperature or which otherwise results in the layer or layers being applied as or incorporating metal must be followed by a heating procedure in oxidizing atmosphere to oxidize the metal and partially react the oxide coating with the chromium oxide interconnect surface to form the spinel intermediate layer.

Where a dopant is applied, normally in metallic form, as a separate layer prior to the coating material, as in FIGS. 7b–7d, it is believed that the dopant will be transported throughout the oxide coating, and therefore throughout the intermediate spinel layer, and possibly throughout the chromium oxide surface layer on the interconnect substrate, during the heating step in the oxidizing atmosphere.

Mixed and doped coating compositions which have been investigated include:

Manganese oxide+Cobalt oxide (0.1–20%)
Manganese oxide+Vanadium oxide (0.1–10%)
Manganese oxide+Iron oxide (0.1–20%)
Manganese oxide+Magnesium oxide (0.1–5%)
Manganese oxide+Nickel oxide (0.1–20%)
Manganese matal+Nickel metal (0.1-14 20%): combined or Mn on top of Ni layer layer
Manganese oxide+(Cu oxide+Ni oxide) (1–20%)
Mn metal+Mn oxide+Ni oxide.

EXAMPLE 12

Figure 8:
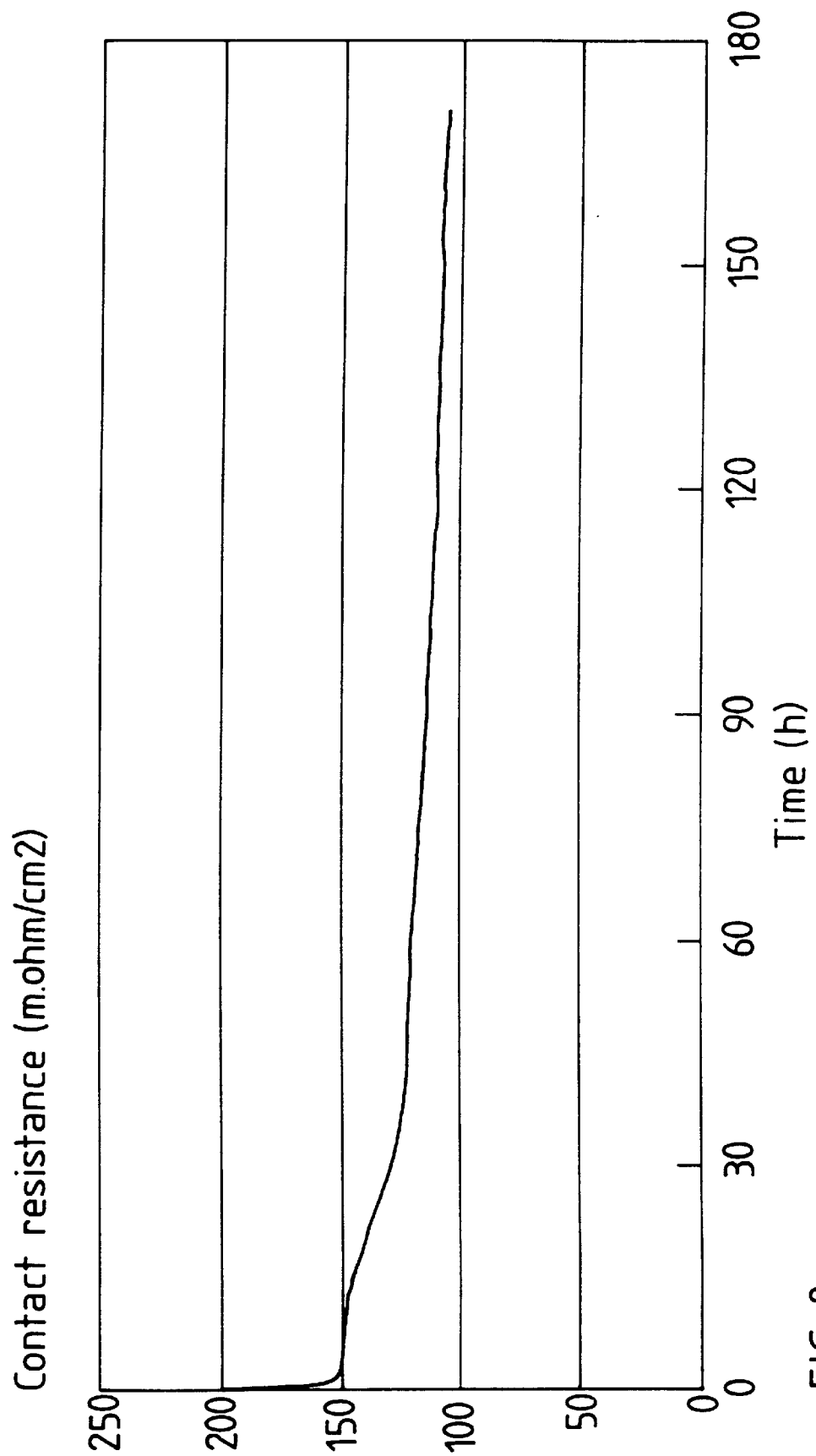
FIGS. 8 and 9 are graphs illustrating, respectively, the contact resistance and polarisation voltage of the coated interconnect substrate described in Example 12.
Figure 9:
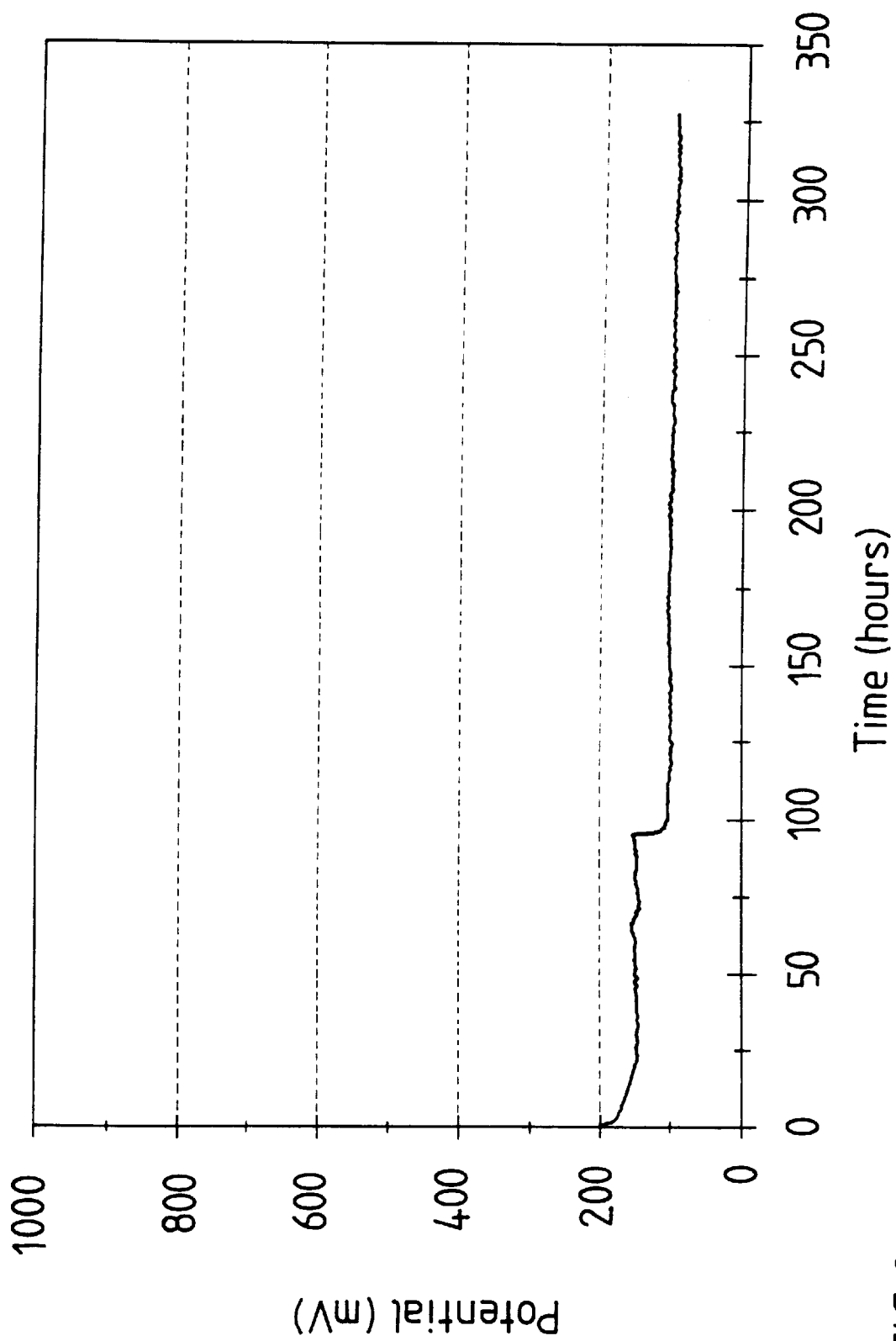

A slurry of nickel oxide and manganese oxide was made up to produce a 1% nickel oxide-doped manganese oxide composition which was then painted onto a Siemens-Plansee alloy interconnect substrate. The coating was heated in air at 900° C. to partially react the oxide with chromium oxide on the surface of the substrate to form an intermediate spinel layer. The contact resistance (m.ohm/cm$^2$) and polarisation (mV) measurements for the coated interconnect were measured in the cell 40 (FIG. 2) and as previously described with reference thereto. The results of these measurements are shown in FIGS. 8 and 9 respectively. As may be seen, the contact resistance and polarisation voltage decreased from initial levels and were then relatively stable over many hours. In contrast, for an uncoated interconnect the contact resistance increased from about 200 to about 600 m.ohm/cm$^2$ over about 140 hours and the polarisation potential increased from about 600 to about 1400 mV over less than 50 hours (similarly to the polarisation measurements described with reference to FIG. 3).

EXAMPLE 13

Figure 10:
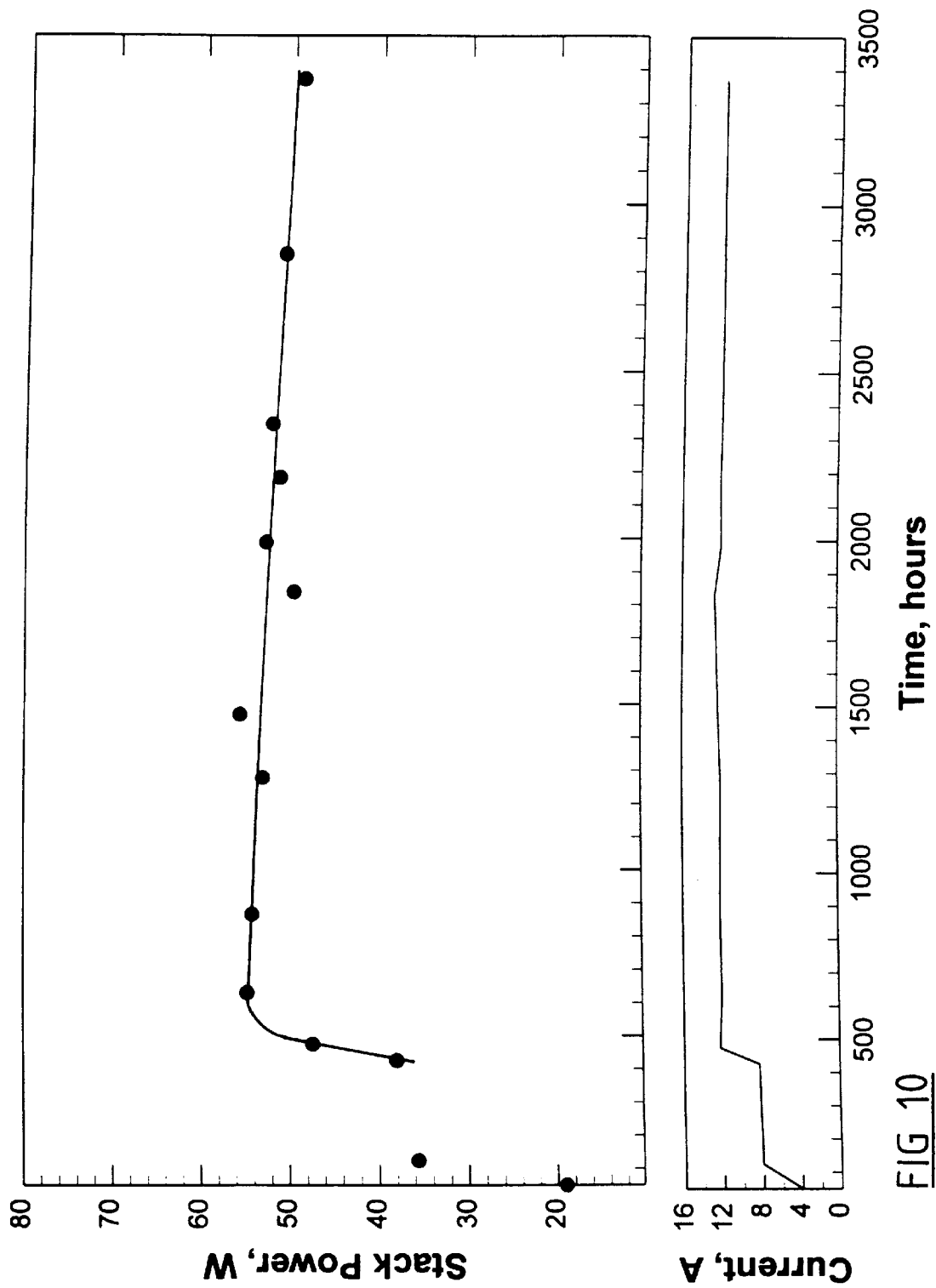
FIG. 10 is a graph illustrating the power output as a function of time of the fuel cell stack described in Example 13.

A fuel cell stack comprising 6 fuel cells with interconnects and a cathode-side end plate prepared as described in Example 12 was constructed, with each fuel cell having an area of 81 cm$^2$. The power output of the stack was measured over 3500 hours, operating at 930° C. and at a current density of 150 mA/cm$^2$ with air as the oxidant and a mixture of 96% H$_2$/4% H$_2$O as previously described as the fuel. The relatively stable output is shown in FIG. 10, from which the non-contamination by chromium oxide of the Y$_2$O$_3$-doped ZrO$_2$ electrolyte/LSM cathode interface may be recognised.

EXAMPLE 14

Figure 11:
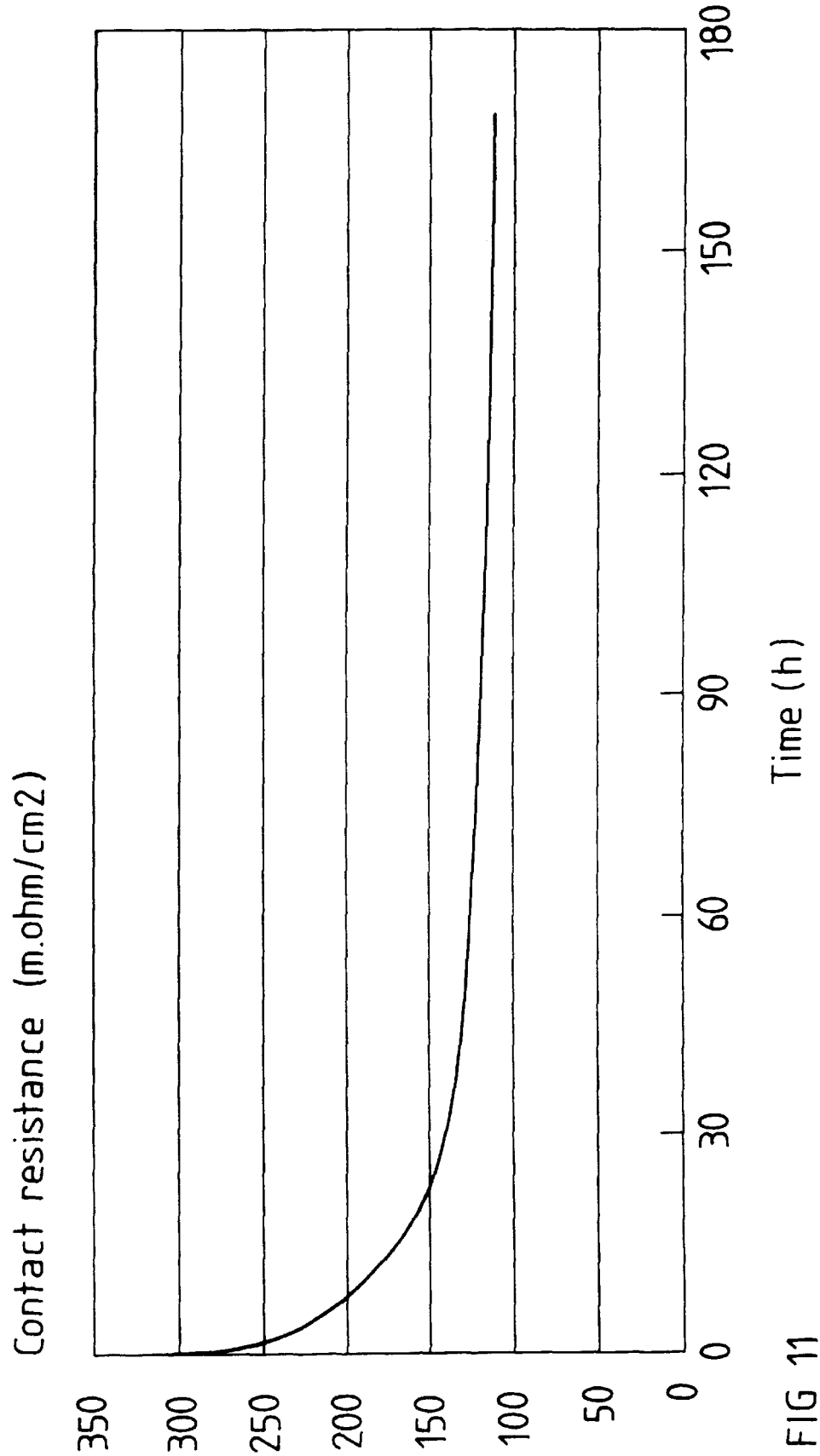
FIGS. 11 and 12 are graphs illustrating, respectively, the contact resistance and polarisation voltage of the coated interconnect substrate described in Example 14.
Figure 12:
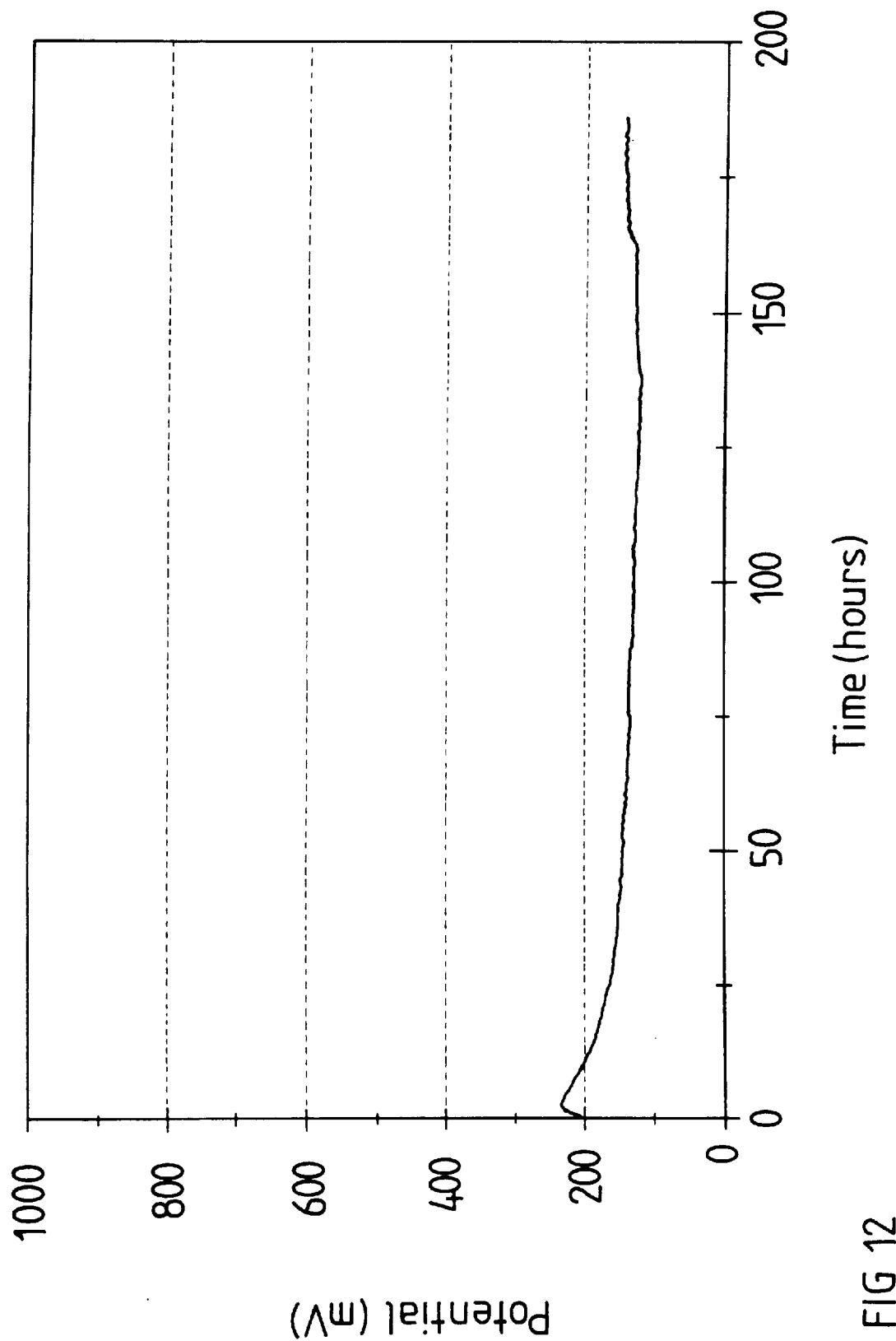

A mixture (approximately equal parts) of manganese metal and manganese oxide, doped with nickel oxide, was made up as a slurry which was then painted onto a Siemens-Plansee alloy interconnect substrate. The coating was heated in air at 900° C. to oxidize the manganese metal and to partially react the oxide with chromium oxide on the surface of the substrate to form an intermediate spinel layer. The contact resistance (m.ohm/cm$^2$) and polarisation (mV) measurements for the coated interconnect was measured in the cell 40 (FIG. 2) and as previously described with reference thereto. The results of these measurements are shown in FIGS. 11 and 12 respectively. As may be seen, the contact resistance decreased from an initial level of about 300 m.ohm/cm$^2$ over about 100 hours and then remained stable at about 115 m.ohm/cm$^2$. With reference to FIG. 12, the polarisation voltage increased a small amount initially from 200 mV before gradually reducing to a relatively stable level of about 150 mV.

EXAMPLE 15

Figure 13:
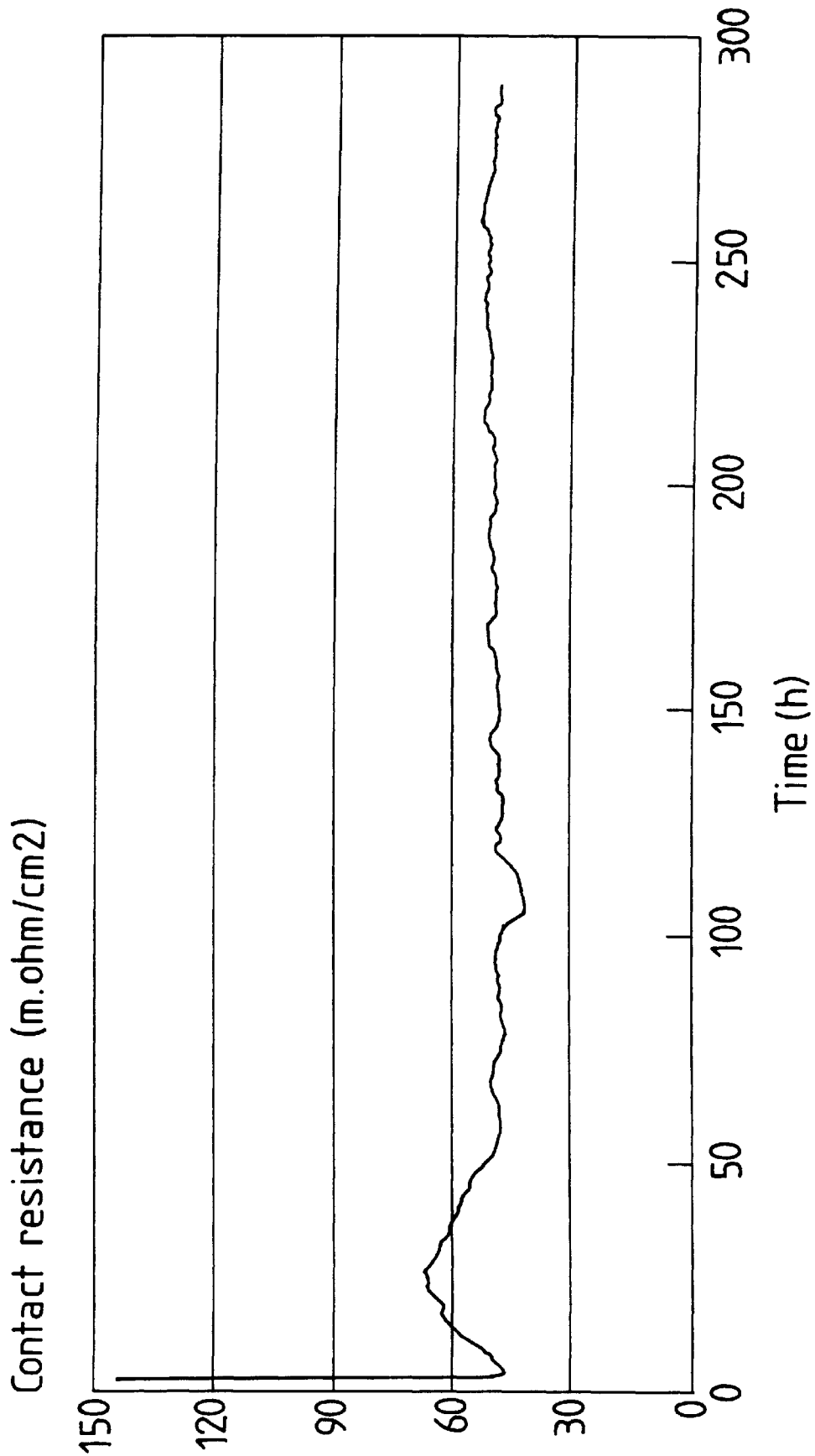
FIGS. 13 and 14 are graphs illustrating, respectively, the contact resistance and polarisation voltage of the coated interconnect substrate described in Example 15.
Figure 14:
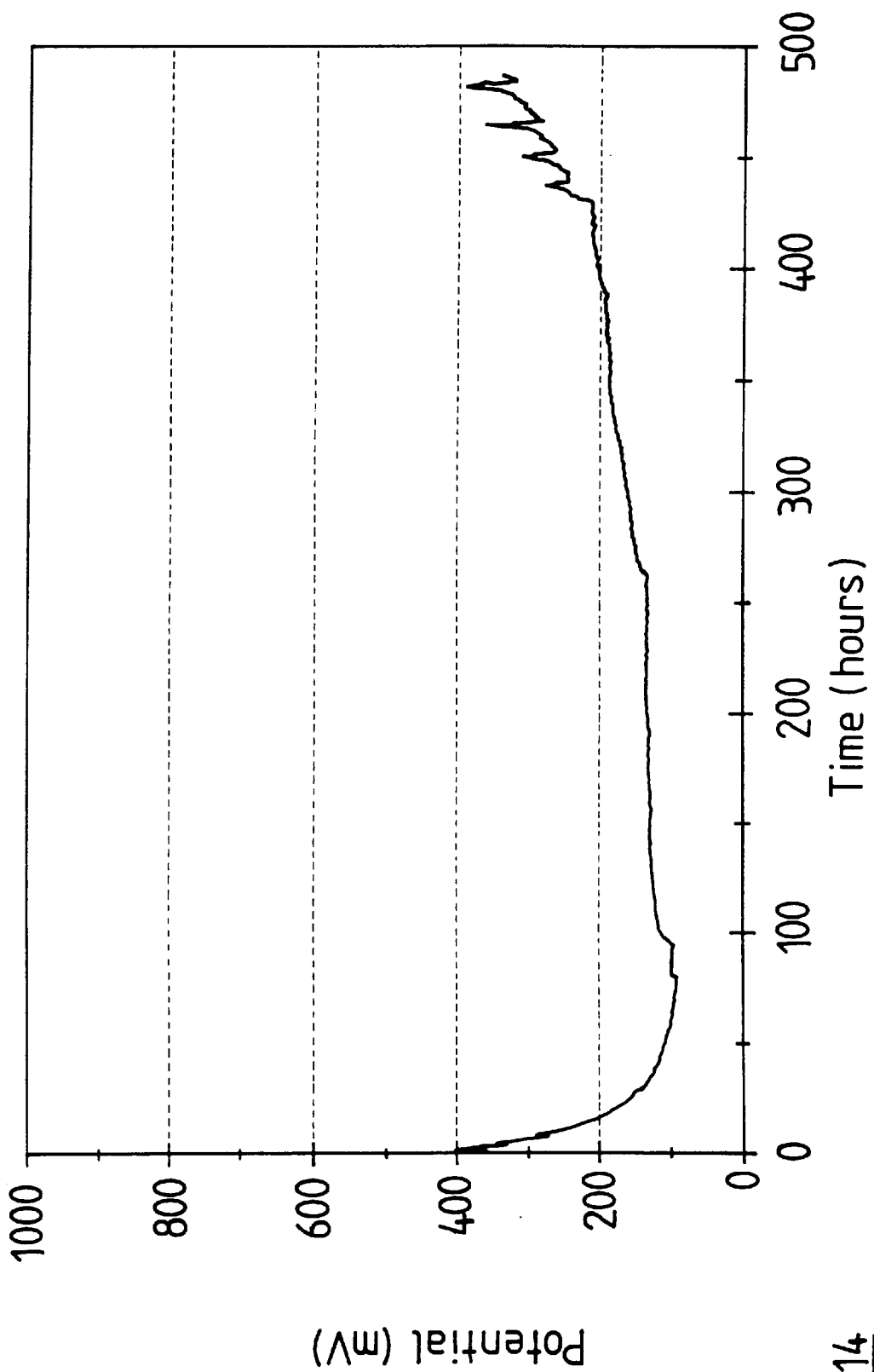

A nickel metal layer was sputter coated onto a Siemens-Plansee alloy interconnect substrate, followed by sputter coating of a manganese metal layer, with the proportion of nickel being about 1% by weight of the manganese. The coating was heated in air at 900° C. to oxidize the metal and to partially react the oxide with chromium oxide on the surface of the substrate to form an intermediate spinel layer. The contact resistance (m.ohm/cm$^2$) and polarisation (mV) measurements for the coated interconnect were measured in the cell 40 (FIG. 2) and as previously described with reference thereto in air at 900° C. and 200 mA/cm$^2$. The results of these measurements are shown in FIGS. 13 and 14 respectively. As may be seen in FIG. 13, the contact resistance decreased immediately before settling down after about 50 hours at a level of about 45 m.ohm/cm$^2$. FIG. 14 illustrates how the polarisation voltage decreased over about 100 hours from 400 mV to about 100 mV, at which level the voltage was relatively stable for about another 150 hours before gradually climbing again.

EXAMPLE 16

Figure 15:
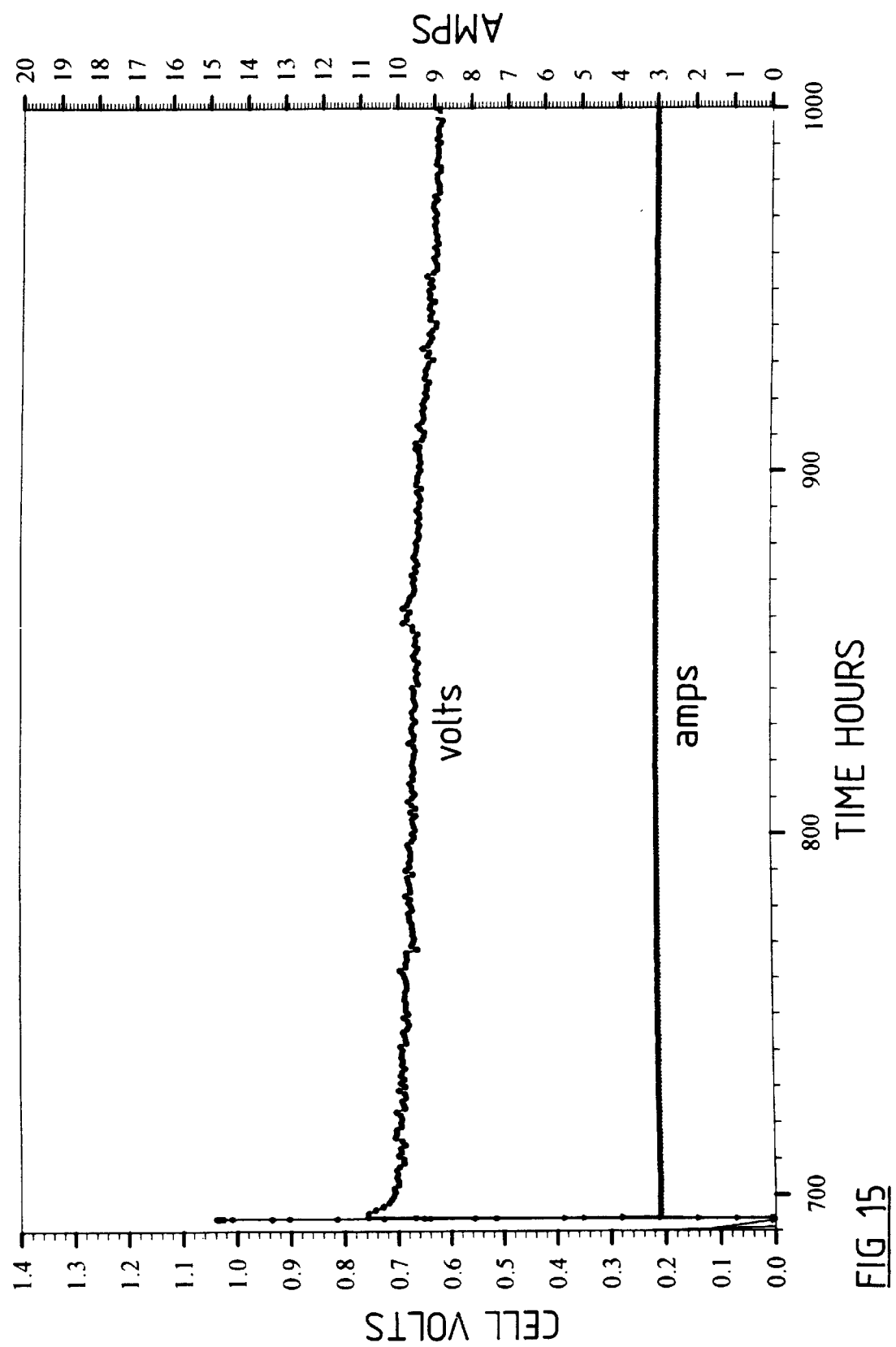
FIG. 15 is a graph illustrating the performance as a function of time of the single fuel cell assembly described in Example 16.

A fuel cell assembly comprising a single fuel cell with a cathode-side end plate prepared as described in Example 15 was constructed, with the fuel cell having an area of 25 cm². The performance of the fuel cell assembly was measured over 1000 hours, at 930° C. with air as the oxidant and a mixture of 96% $H_2$/4%$H_2O$ as previously described as the fuel. The stable power output and cell voltage from about 700 hours is clearly illustrated in FIG. 15, from which the non-contamination by chromium oxide of the $Y_2O_3$-doped $ZrO_2$ electrolyte/LSM cathode interface may be recognized.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

The claims defining the invention are as follows :

1. An electrical interconnect device for a planar fuel cell comprising solid oxide electrolyte, an anode, and a cathode, wherein the interconnect device comprises a plate-shaped chromium-containing substrate having oxidant gas-flow channels on the cathode-side and a coating on said cathode-side, the coating comprising an oxide surface layer comprising at least one metal M selected from the group Mn, Fe, Co and Ni and an M, Cr spinel layer intermediate the substrate and the oxide surface layer.

2. An electrical interconnect device according to claim 1 wherein the Cr content of the spinel layer decreases with increasing distance from the substrate through the thickness of the coating.

3. An electrical interconnect device according to claim 1 wherein the spinel layer has a thickness in the range of less than 1 to about 20 microns.

4. An electrical interconnect device according to claim 1 wherein the coating has a thickness in the range about 1 to about 100 microns.

5. An electrical interconnect device according to claim 1 wherein the coating is at least substantially fully dense.

6. An electrical interconnect device according to claim 1 wherein the oxide and spinel layers comprise a mixture of two metals M.

7. An electrical interconnect device according to claim 6 wherein the mixture is selected from the group consisting of Ni and Mn, Co and Mn, and Fe and Mn.

8. An electrical interconnect device according to claim 1 wherein the coating comprises a mixed oxide surface layer and a mixed spinel layer comprising the at least one metal M and a non-M metal to increase electrical conductivity of the coating.

9. An electrical interconnect device according to claim 8 wherein the non-M metal is Cu.

10. An electrical interconnect device according to claim 1 wherein the coating includes inert oxide filler.

11. An electrical interconnect device according to claim 10 wherein the filler is selected from the group consisting of alumina, zirconia, and mixtures thereof.

12. An electrical interconnect device according to claim 1 wherein the at least one metal M in the coating is doped to increase electrical conductivity of the coating.

13. An electrical interconnect device according to claim 12 wherein the maximum dopant level is about 20%, by weight of the at least one metal M.

14. An electrical interconnect device according to claim 12 wherein the maximum dopant level is about 10%, by weight of the at least one metal M.

15. An electrical interconnect device according to claim 1 wherein the at least one metal M in the coating is doped with at least one other metal selected from the group consisting of Mn, Fe, Cu, Ni, Co, Cr, Ti, V and Mg.

16. An electrical interconnect device according to claim 15 wherein the dopant level is in the range about 0.1 to about 20%, by weight of the at least one metal M.

17. An electrical interconnect device according to claim 15 wherein the dopant level is in the range of about 0.1 to about 10%, by weight of the at least one metal M.

18. An electrical interconnect device according to claim 1 wherein the coating is provided only on the cathode-contacting surfaces of said cathode-side of the substrate.

19. An electrical interconnect device according to claim 1 wherein the chromium-containing substrate comprises a material selected from the group consisting of a cermet comprising Cr and Ni and a ceramic, a Siemens-Plansee alloy, Haynes 230 alloy, Nicrofer, Inconel, ferritic steels and other chromium-containing steels.

20. An electrical interconnect device according to claim 1 wherein the chromium-containing substrate material is doped to improve electrical conductivity.

21. An electrical interconnect device according to claim 1 wherein surface chromium oxide on the chromium-containing substrate is doped with one or more metals selected from the group consisting of Mn, Fe, Cu, Ni, Co, Ti, V, Mg, Li and rare earth metals.

22. A planar fuel assembly including a fuel cell comprising a solid oxide electrolyte, a cathode and an anode, and an interconnect device according to claim 1 in electrical contact with the cathode.

23. A planar fuel assembly according to claim 22 wherein the cathode comprises an M metal oxide.

24. A planar fuel assembly according to claim 22 wherein the cathode material has a perovskite structure of the general formula $RXO_3$ where R is a rare earth metal or a mixture of any of these rare earth metals, optionally doped, and X is selected from one or more of the group of metals Mn, Fe, Co, Ni and Cr.

25. A planar fuel assembly according to claim 24 wherein M is Mn and the cathode comprises strontium-doped lanthanum manganite.

26. A method of preparing an electrical interconnect device according to claim 1 which comprises coating the cathode-contacting surface of the chromium-containing substrate with one or more materials selected from the group consisting of at least one M-metal oxide, at least one M-metal salt and at least one M-metal, subjecting any M-metal salt and M-metal to oxidation to produce an M-metal oxide coating, and partially reacting the M-metal oxide coating with surface chromium oxide on the cathode-contacting surface of the chromium-containing substrate to form the M, Cr spinel layer intermediate the substrate and the M-metal oxide surface layer.

27. A method according to claim 26 wherein the coating material comprises M-metal oxide and is applied at elevated temperature whereby the M, Cr intermediate spinel layer forms as the coating material is applied to the substrate.

28. A method according to claim 27 wherein the elevated temperature is a temperature of about 500° C. or greater.

29. A method according to claim 26 wherein the coating material comprises M-metal oxide and the coated interconnect surfaces are subjected to heat treatment at an elevated temperature to partially react the M-metal oxide coating with the surface chromium oxide.

30. A method according to claim 29 wherein the elevated temperature is in the range from about 500° C. to about 1150° C.

31. A method according to claim 29 wherein the heat treatment is performed at a controlled oxygen partial pressure.

32. A method according to claim 26 wherein the coating material comprises one or more of the M-metal salt and M-metal and wherein the oxidation of the coating material to produce the M-metal oxide coating and the partial reaction of the M-metal oxide coating are performed concurrently by a heat treatment at elevated temperature.

33. A method according to claim 32 wherein the elevated temperature is in the range from about 500° C. to about 1150° C.

34. A method according to claim 32 wherein the heat treatment is performed at a controlled oxygen partial pressure.

35. A method according to claim 26 wherein the coating material comprises a mixture of two metals M.

36. A method according to claim 35 wherein the mixture is selected from the group consisting of Ni and Mn, Co and Mn, and Fe and Mn.

37. A method according to claim 26 wherein the oxide coating comprises a mixture of the at least one M metal oxide and a non-M metal oxide.

38. A method according to claim 37 wherein the non-M metal is in oxide form prior to applying the coating material to the substrate.

39. A method according to claim 37 wherein the non-M metal is Cu.

40. A method according to claim 26 wherein the coating material includes inert oxide filler.

41. A method according to claim 40 wherein the filler is selected from the group consisting of alumina, zirconia, and mixtures thereof.

42. A method according to claim 26 which includes doping the at least one metal M in the oxide coating to increase the electrical conductivity of the coating.

43. A method according to claim 26 which includes mixing a dopant material with the coating material prior to application to the substrate, the dopant material comprising at least one metal selected from the group consisting of Mn, Fe, Cu, Ni, Co, Cr, Ti, V and Mg.

44. A method according to claim 43 wherein the dopant material is in metallic or oxide form.

45. A method according to claim 43 wherein the dopant level is in the range about 0.1 to about 20%, by weight of the at least one metal M.

46. A method according to claim 43 wherein the dopant level is in the range of about 0.1 to about 10%, by weight of the at least one metal M.

47. A method according to claim 26 which includes coating a layer of dopant material on the cathode-contacting surface of the chromium-containing substrate prior to application of the coating material thereto, said dopant material comprising at least one metal selected from the group Mn, Fe, Cu, Ni, Co, Cr, Ti, V and Mg.

48. A method according to claim 47 wherein the dopant material is applied in metallic form.

49. A method according to claim 47 wherein the dopant level is in the range about 0.1 to about 20%, by weight of the at least one metal M.

50. A method according to claim 47 wherein the layer of dopant material has a thickness in the range about 0.01 to about 20 microns.

51. A method according to claim 47 wherein the dopant level is in the range of about 0.1 to about 10%, by weight of the at least one metal M.

52. A method according to claim 26 wherein the oxide coating has a thickness in the range from about 1 to 100 microns.

53. A method according to claim 26 wherein the chromium-containing substrate material is doped to improve electrical conductivity.

54. A method according to claim 26 wherein the surface chromium oxide of the chromium-containing substrate is doped with one or more metals selected from the group consisting of Mn, Fe, Cu, Ni, Co, Ti, V, Mg, Li and rare earth metals.

55. A method according to claim 26 wherein the cathode-contacting surface of the chromium-containing substrate is cleaned prior to application of the coating material.

56. A method according to claim 55 wherein after cleaning the cathode-contacting surface and prior to application of the coating material the cathode-contacting surface is subjected to pre-oxidation in a controlled environment to provide controlled chromium oxide scale formation.

57. A method according to claim 26 wherein prior to application of the coating material the cathode-contacting surface of the chromium-containing substrate is subjected to heat treatment in contact with a rare earth oxide at a controlled oxygen partial pressure.

58. A method according to claim 26 wherein the oxide coating has a thickness in the range of about 1 to about 50 microns.

59. A method according to claim 26 wherein the oxide coating has a thickness in the range of about 1 to about 20 microns.

60. An electrical interconnect device according to claim 1 wherein the spinel layer has a thickness of less than about 1 to about 5 microns.

61. An electrical interconnect device according to claim 1 wherein the coating has a thickness in the range of about 1 to about 50 microns.

62. An electrical interconnect device according to claim 1 wherein the coating has a thickness in the range of about 1 to about 20 microns.

* * * * *